(12) United States Patent
Bakalash et al.

(10) Patent No.: US 9,082,196 B2
(45) Date of Patent: Jul. 14, 2015

(54) APPLICATION-TRANSPARENT RESOLUTION CONTROL BY WAY OF COMMAND STREAM INTERCEPTION

(71) Applicant: Lucidlogix Software Solutions, Ltd., Netanya (IL)

(72) Inventors: Reuven Bakalash, Shdema (IL); Yoel Shoshan, Haifa (IL); Offir Remez, Hod HaSharon (IL)

(73) Assignee: LUCIDLOGIX TECHNOLOGIES LTD. (IL)

( * ) Notice: Subject to any disclaimer, the term of this patent is extended or adjusted under 35 U.S.C. 154(b) by 294 days.

(21) Appl. No.: 13/789,518

(22) Filed: Mar. 7, 2013

(65) Prior Publication Data

US 2013/0176322 A1    Jul. 11, 2013

Related U.S. Application Data

(63) Continuation-in-part of application No. 13/437,869, filed on Apr. 2, 2012, now Pat. No. 8,754,904, and a continuation-in-part of application No. 12/229,215, filed on Aug. 20, 2008, now abandoned.

(60) Provisional application No. 61/609,268, filed on Mar. 10, 2012, provisional application No. 61/747,630, filed on Dec. 31, 2012.

(51) Int. Cl.
*G06T 1/20* (2006.01)
*G06T 15/00* (2011.01)

(52) U.S. Cl.
CPC ............... *G06T 1/20* (2013.01); *G06T 15/005* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 7,099,020 B1 * | 8/2006 | Toriyama et al. | 358/1.13 |
| 8,294,714 B1 * | 10/2012 | Bakdash et al. | 345/428 |
| 2002/0140992 A1 * | 10/2002 | Konagaya | 358/461 |
| 2005/0083327 A1 * | 4/2005 | Noyle | 345/419 |
| 2005/0086669 A1 * | 4/2005 | Boyd et al. | 719/328 |
| 2012/0019552 A1 * | 1/2012 | Schildermans et al. | 345/619 |
| 2012/0169736 A1 * | 7/2012 | Wells et al. | 345/428 |

\* cited by examiner

*Primary Examiner* — Maurice L McDowell, Jr.
(74) *Attorney, Agent, or Firm* — ISUS Intellectual Property PLLC

(57) ABSTRACT

A method for controlling image resolution in graphics systems at runtime is provided. In use, the stream of commands and Shaders of the running application is intercepted and analyzed at run time. In the event that an on-the-fly change of resolution is required, the change is made by modification of the Shader assembly code or of the graphics library commands.

12 Claims, 12 Drawing Sheets

APPLICATION-TRANSPARENT RESOLUTION CONTROL BY WAY OF COMMAND STREAM INTERCEPTION

CROSS REFERENCE TO RELATED CASES

The present application claims priority to the U.S. Provisional Application No. 61/609,268 filed Mar. 10, 2012 entitled "Dynamic Resolution Rendering by Way of Command Stream Interception," and to the U.S. Provisional Application No. 61/747,630 filed Dec. 31, 2012 entitled "Playability-Aware Power Conservation Management of Graphics Systems." It is a Continuation in Part (CIP) of the following U.S. application Ser. No. 12/229,215 filed Aug. 20, 2008 entitled "Multimode Parallel Graphics Rendering Systems and Methods Supporting Task-Object Division," and Ser. No. 13/437,869 filed Apr. 2, 2012 entitled "Virtualization Method of Vertical-Synchronization in Graphics Systems;" each said patent being commonly owned by LucidLogix Ltd., and being incorporated herein by reference as if set forth fully herein.

FIELD

The present invention relates generally to the field of computer graphics rendering, and more particularly, ways of and means for improving the performance of rendering processes supported on GPU-based 3D graphics platforms associated with diverse types of computing machinery.

BACKGROUND

Power conservation management is vital in graphics systems operating off battery or other such exhaustible power source. Specifically, the top video game applications of contemporary gaming industry are very demanding in terms of graphics processing power. Those applications are typically running on a desktop system at a high frame rate of 50-300 FPS, assisted by powerful discrete GPUs.

The discrete GPU is an extreme power consumer in computer systems, therefore in off battery systems it is mostly replaced by an integrated GPU. An integrated GPU is much less power hungry. However, the increasing use of iGPUs in a battery powered devices, such as notebooks, tablets and mobile phones, calls for optimizing iGPUs power consumption to achieve better power efficiency. This is particularly important for real time graphics applications, such as video games, because there is a great need to make these applications playable on the above mentioned battery power devices. For that reason, the embodiments of present invention target primarily integrated GPUs, although it is applicable to discrete GPUs as well.

Integrated GPU (iGPU) is a graphics processor integrated onto a motherboard or right onto the CPU die as the graphic element of multicore, together with one or more CPU cores. Integrated GPUs utilize a portion of a computer's system memory rather than dedicated graphics memory. Integrated GPUs are, in general, cheaper to implement than discrete GPUs, but are typically lower in capability and operate at reduced performance levels relative to discrete GPUs. Integrated GPUs are used in embedded systems, mobile phones, personal computers, workstations, and game consoles. More than 90% of new desktop and notebook computers have integrated GPUs, which are usually far less powerful than those on a dedicated video card. Computers with integrated graphics account for 90% of all PC and notebook shipments. These solutions are less costly to implement than dedicated graphics solutions, but tend to be less capable. Historically, integrated GPUs were often considered unfit to play 3D games. However, modern integrated graphics processors are capable to struggle with the latest games. iGPUs like the Intel's HD Graphics 3000 and AMD's Fusion IGPs have improved performance that may match cheap dedicated graphic cards, but still lag behind the more expensive dedicated graphics cards. While older platforms had the IGP integrated onto the motherboard, newer platforms (Intel Core i series and AMD Fusion) integrate the GPU right onto the CPU die.

Gamer's satisfaction is a major factor in usage of video gaming products. It is based on the user's experience throughout the gaming session, which in turn depends on the frame rate, image resolution, responsiveness and on minimization of dull waitings (such as loading times). Unfortunately, the user's experience is very often jeopardized by the need to manage power consumption, by automatically lowering the frame rate, resolution or backlight for the sake of power reduction, but deteriorating the playability of the game. We define playability as the capability of a graphic's system to deliver an adequate player's experience in video games, despite power reduction. Player's experience is affected by several factors: frame rate, image resolution, responsiveness lag, asset loading time, and image quality. Playability is about delineating the limits for each one of those factors, and managing the power conservation in a manner that user's experience does not drop below the defined threshold. A region of playability is shown in FIG. 1, which is between the best and the bearable user's experience. The lowest limit of playability forces the lowest allowed power consumption, Threshold 1, preventing the deterioration of user's experience.

In prior art there are various ways to manage power consumption in graphics. All of them are based on manually activated transition to power saving mode, or on automatic transition to power saving mode triggered by frame duration, or by battery state. None is driven by a trade off of the power saving and playability of the game application, as in the present invention.

Typically, prior art's power consumption management solutions are driven by lowering performance, clock speeds and frequencies, refresh rate or adjusting screen brightness. According to Wyatt et al. in US 2008/0143729, a refresh rate of graphics subsystem is adjusted for power saving purposes, only under power saving mode, uncoupled to user experience. Lin et al., in US 2003/0233592 teaches two embodiments of power saving for graphics systems, one by disabling the graphics system for some gating time, and second by reducing the clock frequency of graphics rendering engine by a calculated clock-scale-factor. Both are triggered by a measured frame duration. Fan et al., US 2009/0295794, discloses power saving in GPU by disabling some of the stream processors, when the graphics processing unit is in the power-saving mode. Wyatt et al. in US 2012/0206461 teaches a self-refreshing display device operated in a self refresh mode for power saving. The graphics controller coupled to the display device is set in one or more power saving states. Woo-Up Kwon in US 2012/0280921 discloses a method for controlling screen brightness for power conservation, where the screen touch action is sensed. Hassan Azar et al., US 2010/0123725, disclose a method of adjusting pictures previously generated by a discrete GPU, by an integrated GPU. The adjustment may be used in conjunction with power saving techniques to maintain the image quality when display backlighting is reduced. The target of Hassan's invention is to adjust video images while minimizing the impact on graphics processing performance. However, it is not automatically aware of the playability limits of gaming applications.

Huang et al., US 2011/0157191, handles situations where a user operates a graphics intensive application from a relatively inexhaustible power source (such as a wall outlet operating on alternating current). When the source becomes unavailable, due to an energy blackout, or travel, etc, instead of terminating the application or operating off the exhaustible DC power source, Huang teaches how to automatically limit the frame rate of an application executing in a discrete graphics processing unit operating off battery or other such exhaustible power source. By automatically limiting the frame rate, the rate of power consumption, and thus, the life of the current charge stored in a battery may be extended. Another embodiment of Huang allows for the more effective application of automatic power conservation techniques during detected periods of inactivity, by applying a low power state immediately after a last packet of a frame is rendered and displayed. By no means Huang's invention takes care for playability of a gaming application.

The white paper "Dynamic Resolution Rendering" by Doug Binks of Intel, describes how developers can dynamically vary the resolution of their rendering instead of having a static resolution selection. Their dynamic resolution rendering uses a viewport function to constrain the rendering to a portion of an off-screen render target, and then to scale the view. This is ported to the application as part of its customized code, or used by graphic application developers for their rendering. Applications without customized porting cannot use the dynamic resolution rendering.

All the above mentioned methods and systems: adjusted refresh rate, gated disabling of a graphics system, reduced clock, reduced screen brightness, dynamic resolution rendering, or picture adjustment, all are targeting power saving. However, no prior art exists for an application transparent playability, where the monitoring of frame rate or image resolution, for an improved power consumption, improved user experience or for another purpose, can be implemented in any gaming application. In prior art there is a need to port a specialized code, prior to running the application (such as described in "Dynamic Resolution Rendering" by Doug Binks of Intel), as part of the application.

Specifically, the dynamic resolution rendering in prior art uses a viewport function to constrain the rendering to a portion of an off-screen render target, and then to scale the view. This is ported to the application as part of its code.

Evidently, applying power saving method in a real time graphics application without being aware of playability, would eventually deteriorate user's experience.

SUMMARY AND OBJECT OF THE PRESENT INVENTION

The present invention provides a method and system for applying automatic power conservation technique for video games or comparable real time graphics applications, while keeping the user's experience above a defined minimal level. The limits of a bearable user's experience are defined as playability. The power conservation is managed such that the playability is always kept.

The playability awareness assists in keeping the gamer's experience within tolerable limits, while managing the power consumption. The main factors controlling power consumptiom consist of frame rate, image resolution, image brightness, and responsiveness. Each one of these factors can potentially harm the playability. Moreover, since there is a mutual dependency among all factors, when a factor is monitored for power consumption, all other factors must be simultaneously monitored, such that playability is kepth within its predefined boundaries. The image resolution factor plays important role in this invention due to its transparency to application, dynamicy and automatization, without a prior customized porting to the application. Such a method would run transparently and simultaneously with the gaming application, dynamically trading off the resolution for frame rate.

The present invention addresses the great need for a true runtime playability-aware power saving method, specifically for integrated GPUs (iGPUs) which play central role in battery powered devices (notebooks, tablets and mobile phones). Nevertheless, the current invention can be applied to discrete GPUs as well.

Another need addressed by the present invention, non-related to power saving, specifically for a non-exhaustible source powered graphics devices, is an increase of frame rate by using dynamic resolution method. For such a source of power, the improved user's experience (by increased FPS), is typically more important than saving power.

BRIEF DESCRIPTION OF DRAWINGS

For a more complete understanding of practical applications of the embodiments of the present invention, the following detailed description of the illustrative embodiments can be read in conjunction with the accompanying drawings, briefly described below.

DESCRIPTION OF THE PRESENT INVENTION

Embodiments of the present invention provide a method and system for applying automatic power conservation technique in graphics system running video games or comparable real time graphics applications, while keeping the user's experience above a defined minimal level. The limits of a bearable user's experience are defined as playability. The power conservation is managed such that the playability is always kept.

Figure 1:
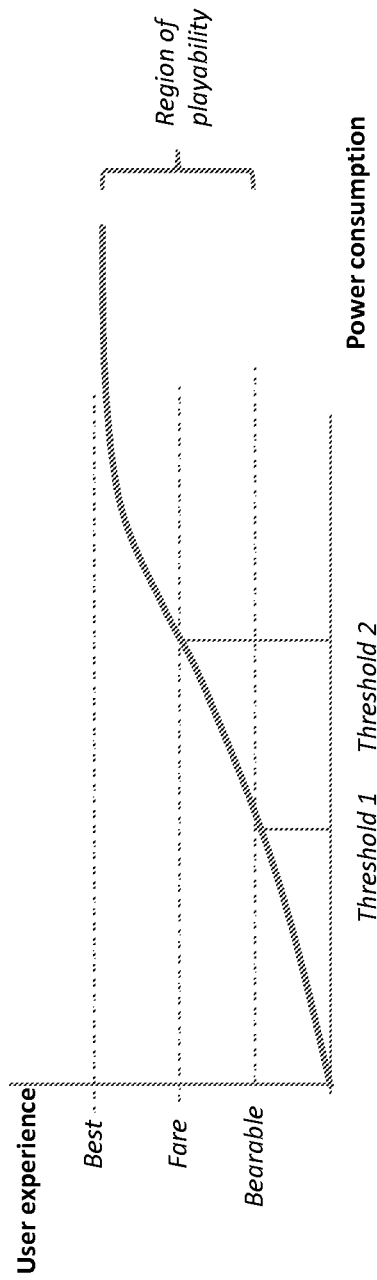
FIG. 1. User's experience vs. power consumption

The current invention refers primarily to one of the most demanding real time graphics applications, video games, however it applies to other real time applications as well. The playability awareness assists in keeping the gamer's experience within tolerable limits, while managing the power consumption. While the power consumption is managed for saving, as depicted in FIG. 1, the user's experience varies between the 'best' at the high end, through 'fair', and down to the 'bearable', which is the lowest allowed experience. According to the FIG. 1, the level of experience can be expressed in terms of power consumption, in such a way that only a given zone of the user's experience is considered as playable. Out of this segment the playability is getting deteriorated, preventing the gamer from enjoying the game. In order to manage a playability aware power saving, the extreme allowable limits must be defined, and not to be crossed. Two such possible power consumption limits are defined in FIG. 1 as Threshold 1 and Threshold 2. Threshold 1 is very sensitive, because even a slight slip in power consumption may kill the playability of the game.

The main playability factors of video game consist of: frame rate, image resolution, image brightness, and responsiveness, all of them are restricted by power conservation.

Figure 2:
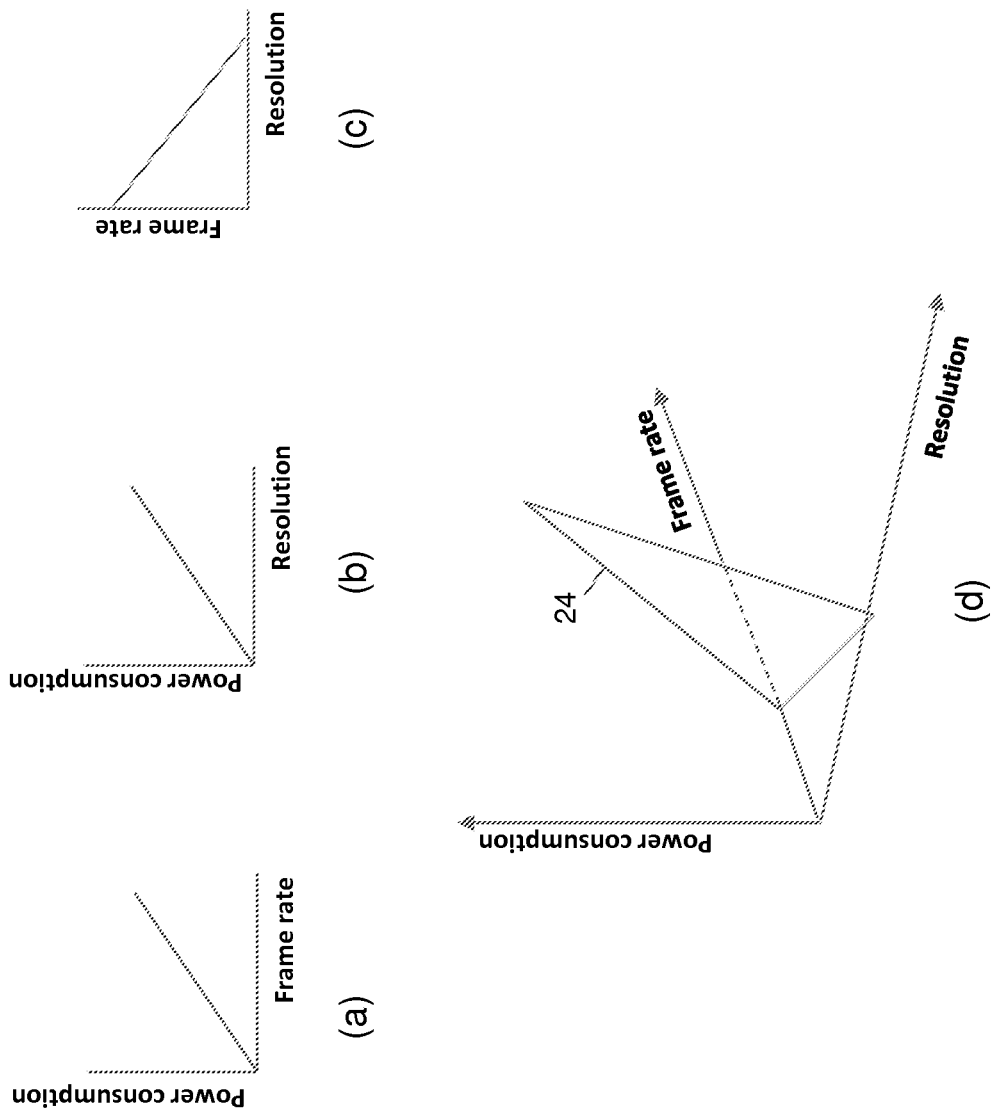
FIG. 2. Mutual dependencies between power consumption, resolution and frame rate.

FIG. 2 demonstrates the mutual dependencies between frame rate, image resolution and power consumption. For clarity a linear function is assumed, whereas in reality the function is not necessarily linear. As shown in FIGS. 2a and 2b power consumption is directly proportional to frame rate and to resolution, respectively. Frame rate and resolution are inversely proportional to each other, as depicted in FIG. 2c. FIG. 2d shows the mutual proportion of all three of them. A virtual plane 24 is created, across which a trade off between the frame rate and resolution takes place. E.g. if the frame-per-second (FPS) drops under 15 FPS causing laggy and unresponsive player experience, it can be raised back by lowering the image resolution, still keeping a constant power consumption level.

Figure 3:
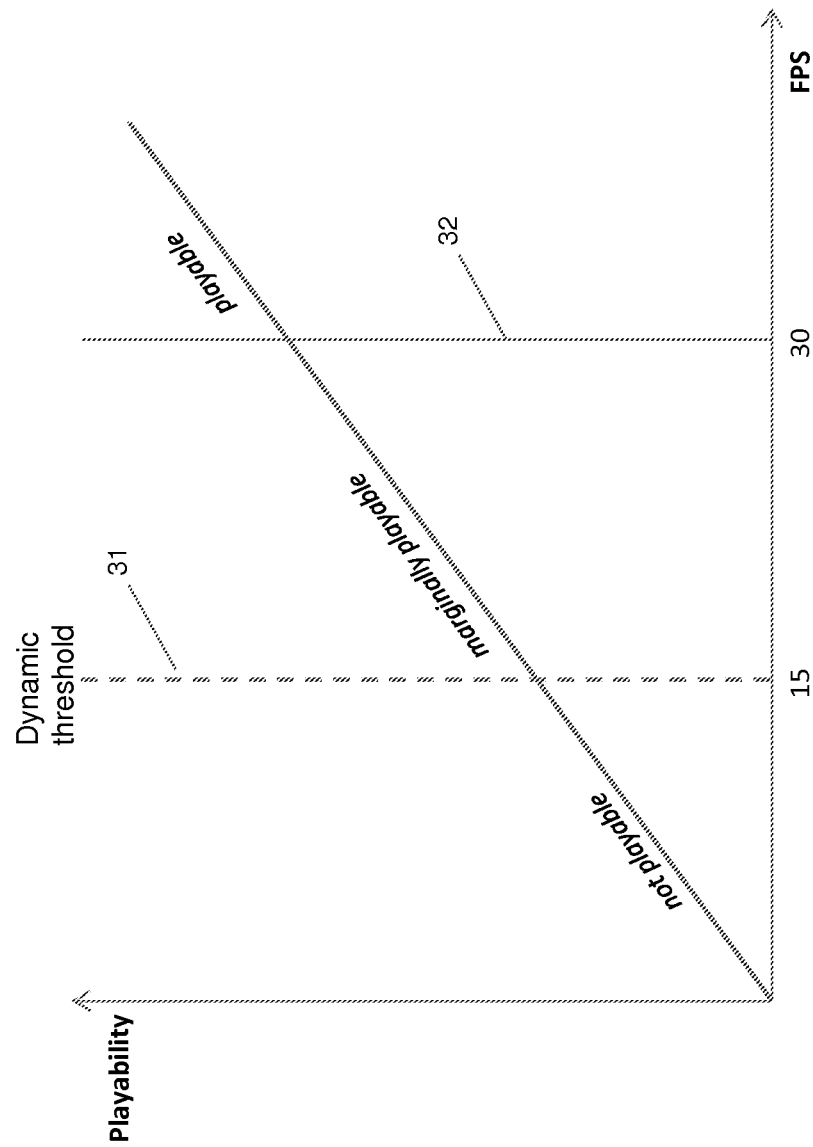
FIG. 3. Playability regions of video games as a function of frame rate.

Frame rate is a major tool for controlling the power consumption of video games. It is very common in a game, to have different scenes in which the frame rate changes dramatically. Even in a single location, when the user turns the mouse to look around, looking in one direction can result in a high frame rate, while changing the view can result in a low frame rate. As seen in FIG. 3, typically, a frame rate below 15 FPS makes those games unplayable. Between 15 FPS and 30 FPS they are only marginally playable. The main reason for this is a non smooth and annoying animation rate, generating user's impression of lack of stability. Fortunately, the frame rate can be improved by trading it off with image resolution. By rendering at a lower resolution, we can balance the frame rate. Even though the visual quality decreases, the overall experience significantly improves, upgrading from "non playable" to "marginally playable", from "non playable" to "playable" or from "marginally playable" to "playable". This tradeoff can be done dynamically during game's runtime.

The thresholds 31 and 32 of FIG. 3 are dynamic thresholds, meaning that the threshold value can be automatically modified in the course of application. The threshold 31 represents the lowest frame rate allowable at a given time, while conserving the playability. This threshold is tightly related to power conservation. Its value can be dynamically varied according to the temporal battery level of the mobile device. When the battery is fully charged a high FPS can be afforded, but when battery goes down, a lower FPS (until the minimum playable FPS) should be set. Meaning, that the level of user's experience, from best, via fair, to bearable, can be a function of the battery level. E.g. a 99% charged battery can allow 70 FPS, while 20% allows only 30 FPS.

Figure 9:
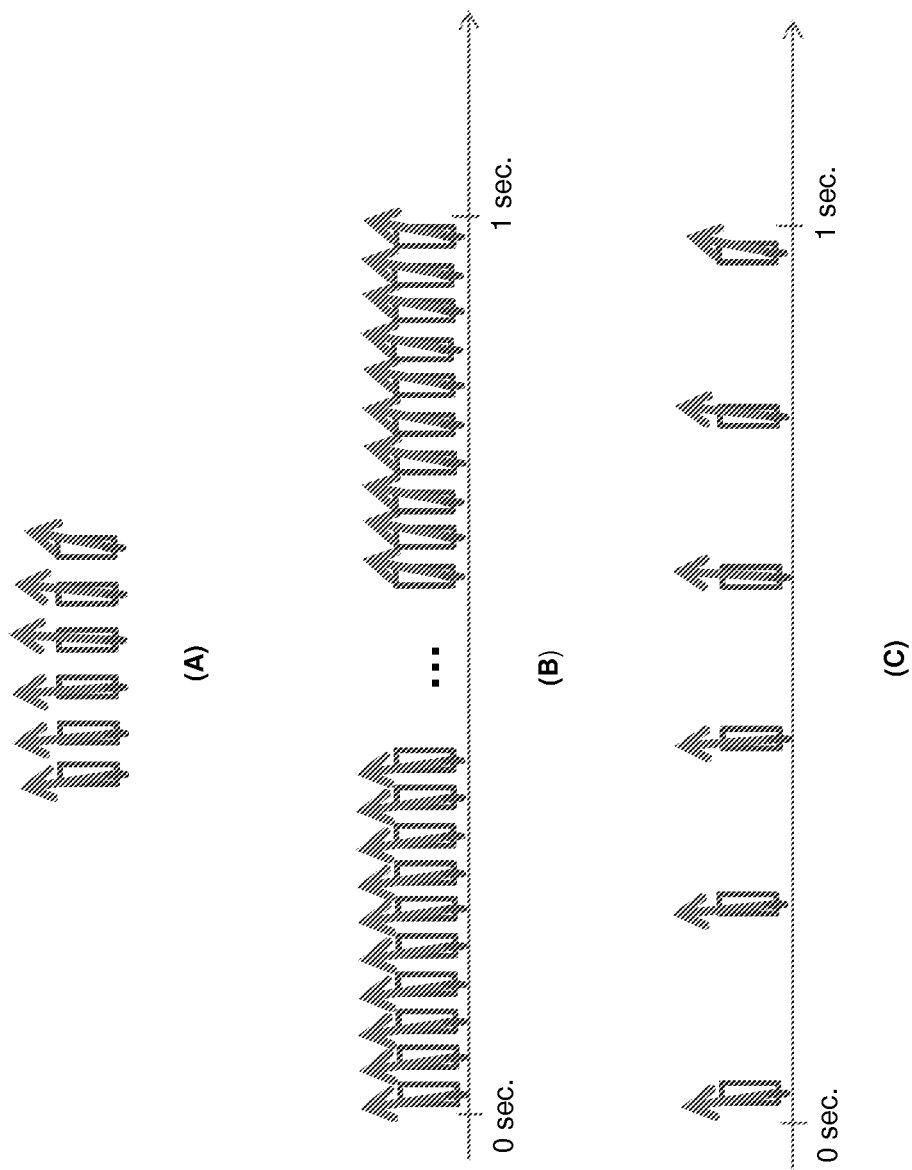
FIG. 9A. An example of a six stage scene motion to be performed in 1 Sec.
FIG. 9B. Scene motion displayed at a high rate of 60 FPS
FIG. 9C. The same scene motion displayed at a low rate of 6 FPS. The display result is exactly the same as in FIG. 9B, but there is energy saving.

Despite the fact that the threshold 31 is on the edge of a non-playable region, in some cases the threshold can be moved even down without violating the playability, but saving power. This is doable when the scene doesn't change, aka temporarily there is a slow or no motion at all. Such a case is illustrated in FIG. 9. FIG. 9A shows an example of a sequence of a 6 stage motion that is scheduled to occur in a given time, 1 second. In FIG. 9B the sequence is played at a high, well playable section, of 60 FPS. Each stage repeats on itself several times, without actually changing the displayed image. FIG. 9C plays the same sequence during the same given time of 1 second, but at a very low rate of 6 FPS. By reducing the FPS an energy is saved, while. The threshold 31 slipped deep into the non playable section reducing drastically the FPS, though the display was preserved and the playability wasn't hurt.

Such a temporary lowering of the dynamic threshold is made possible only when the amount of motion in the scene is very low. The measurement of motion can be done by parsing and analyzing transformation matrices representing objects, cameras and mouse transformation. Another way of detecting slow or null motion is by comparing images of consecutive frames.

Threshold 32 represents the highest frame rate at a given time. This threshold is not necessarily related to power consumption, however it allows to limiting the high bound of FPS. The FPS dynamic threshold policy can be predefined by the user or by the mobile vendor, by means of the dynamic thresholds 31 and 32.

Figure 4A:
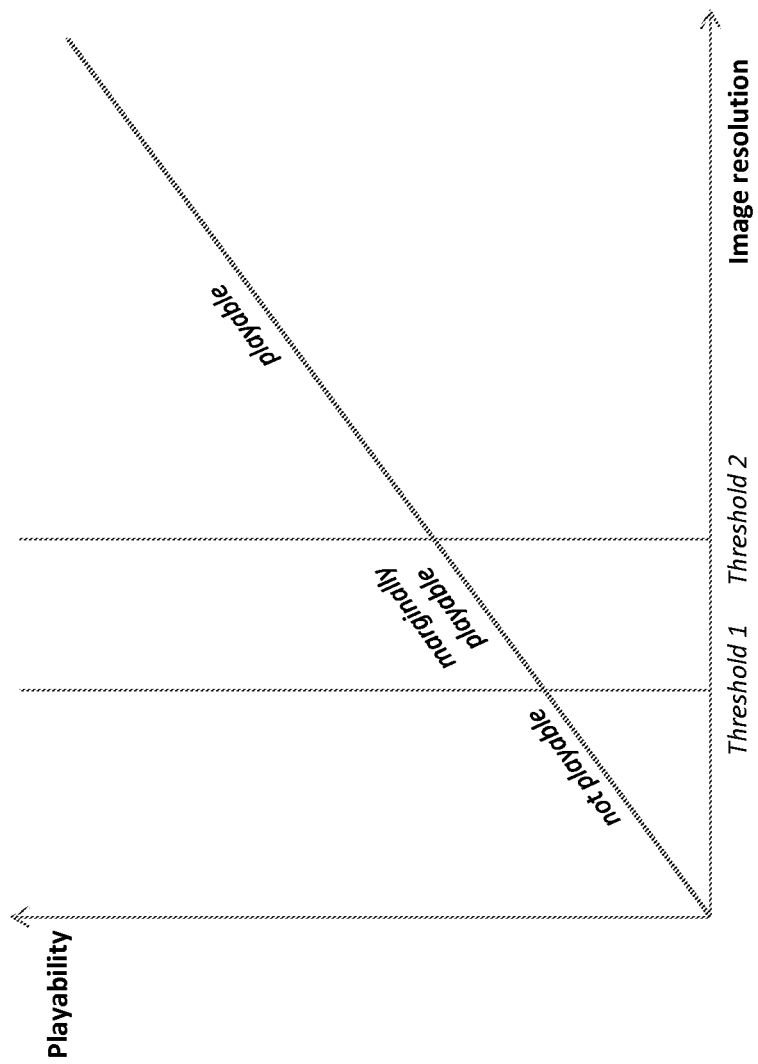
FIG. 4A. Playability regions of video games as a function of image resolution.

Image resolution, stands for pixel count in digital imaging. Resolution describes the detail a video game's image holds. The resolution affects directly the playability, as shown in FIG. 4A: two resolution thresholds are shown, delimiting the marginally playable and non-playable regions, in regard to resolution. The application can be run only within the value of resolution allowed by the thresholds. The resolution also affects power management and the power consumption. The higher resolution the higher power consumption. Therefore the resolution, similarly to the way it is done for frame rate, can be used to adjust power consumption. Resolution, being traded for frame rate, can assist in keeping a given level of power consumption, as shown in FIG. 2D.

The principle of the dynamic thresholding applies to image resolution as well, and at least one threshold is defined. In FIG. 4A two thresholds are shown. The threshold 41 contributes to power conservation by setting the lowest resolution available at a given time while still preserving the playability. Similarly to the FPS lower threshold, its value can be dynamically adjusted according to the temporal battery level of the mobile device. When the battery is fully charged the highest resolution can be afforded, but when battery goes down, a lower resolution contributes to power save. As in the FPS case, the level of user's experience, from best, via fair, to bearable, is effected by image resolution as a function of the battery level. The highest dynamic threshold 42, on the other hand, allows to control the highest bound of image resolution, with no relation to power saving.

Figure 4B:
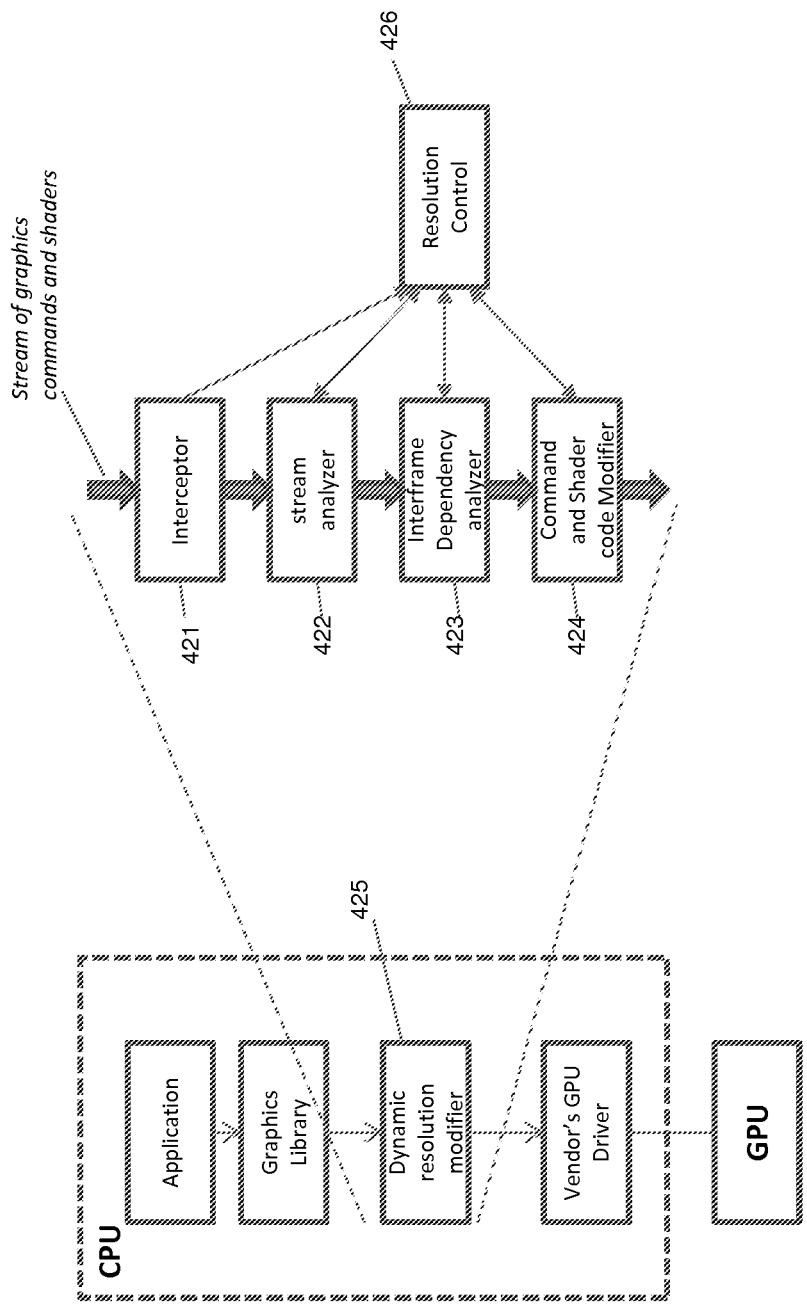
FIG. 4B. The virtualization layer and its location within a graphics system.

The resolution control task of the present invention is carried out by a virtualization layer, decoupling the resolution status of the application from the frame buffer. Such a virtualization layer is shown in FIG. 4B as Dynamic Resolution Modifier 425. The resolution is virtualized during the frame generation, getting its final physical value in the back buffer. The result is a generic mechanism, decoupled from native application parameters, and benefiting mostly the laptops, tablets and mobiles devices.

The stream of commands and shaders of the running application is analyzed at runtime. If a change of resolution is needed, then the on-the-fly resolution change is made by modification of relevant graphics library commands and/or by modification of Shader assembly code. Few examples of the modified commands are: viewport functions (OpenGL: glViewport, DirectX: SetViewPort/SetViewPorts), render targets choosing functions, clear functions, stretch functions and so on.

The uploaded Shader code is modified on-the-fly, to compensate for the changed resolution. For example, a modification of a Shader code to compensate for the smaller rendering area in both the drawing area and the sampling area. The original Shader code before modification:

```
132:CreatePixelShader: D3DDisassemble BEFORE Patching Done.
ps_5_0
dcl_globalFlags refactoringAllowed
dcl_sampler s0, mode_default
dcl_sampler s1, mode_default
dcl_resource_texture2d (float,float,float,float) t0
dcl_resource_texture2d (float,float,float,float) t1
dcl_input_ps linear v1.xy
dcl_output o0.xyzw
dcl_output o1.xyzw
sample_indexable(texture2d)(float,float,float,float) o0.xyzw, v1.xyxx, t0.xyzw, s0
sample_indexable(texture2d)(float,float,float,float) o1.xyzw, v1.xyxx, t1.xyzw, s1
ret
```

And the modified (patched) Shader code:

```
139:CreatePixelShader: D3DDisassemble AFTER Patching Done.140:**********************
ps_5_0
dcl_globalFlags refactoringAllowed
dcl_constantbuffer cb13[17], immediateIndexed
dcl_constantbuffer cb12[2], immediateIndexed
dcl_sampler s0, mode_default
dcl_sampler s1, mode_default
dcl_resource_texture2d (float,float,float,float) t0
dcl_resource_texture2d (float,float,float,float) t1
dcl_input_ps linear v1.xy
dcl_output o0.xyzw
dcl_output o1.xyzw
dcl_temps 2
mov r1.xyzw, cb13[1].xyzw
mov r1.xyzw, v1.xyxx
mul r1.xyzw, r1.xyzw, cb13[1].xyzw
sample_indexable(texture2d)(float,float,float,float) o0.xyzw, r1.xyzw, t0.xyzw, s0
mov r1.xyzw, cb13[2].xyzw
mov r1.xyzw, v1.xyxx
mul r1.xyzw, r1.xyzw, cb13[2].xyzw
sample_indexable(texture2d)(float,float,float,float) o1.xyzw, r1.xyzw, t1.xyzw, s1
ret
```

The patched (modified) and original Shaders can be cached for optimization with their respective hash values for fast query.

A special case is the 2D HUD (heads-up display) which, in contrast to the 3D scene, must not be modified. Rendering the 2D HUD usually takes a small fraction of the overall frame rendering time, but rendering it in low resolution is very disturbing to the user. The change of resolution should be applied to 3D scenes only. The method of selective treatment of HUD is based on the fact that heuristically it is the last task in a frame that writes to the Back Buffer. Alternatively an analysis of Shaders code and constants and/or searching for specific patterns in the Shader assembly code can indicate on beginning of the HUD task. Therefore, the detection of heads-up display is done by accumulating commands and carrying out an analysis prior to releasing the commands down to the rendering pipeline.

Figure 4C:
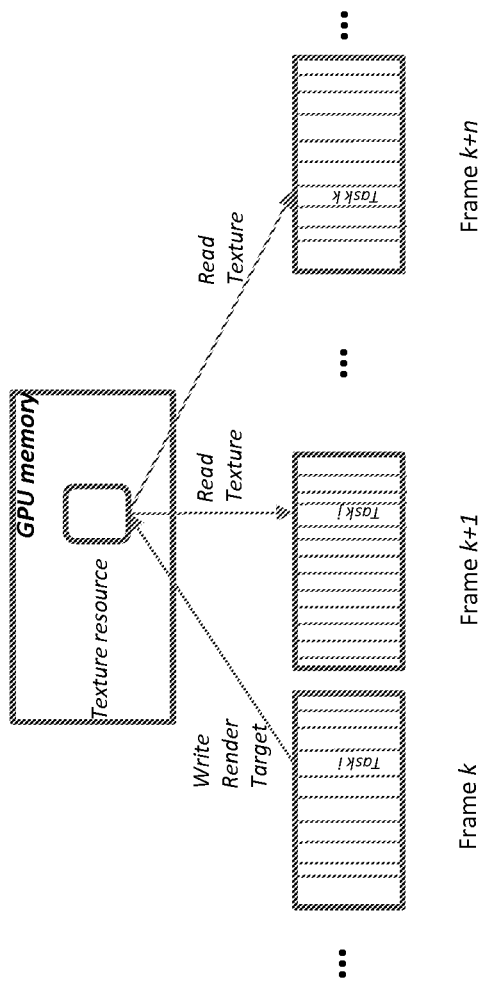
FIG. 4C. The principle of inter-frame dependency.

FIG. 4B illustrates the way the stream of graphics commands and shader code is intercepted and manipulated for a modified resolution. The Dynamic Resolution Modifier 425 breaks down to five building blocks. The Interceptor block is monitoring the context of the stream. The Stream Analyzer block analyzes the components and structure of the frame's stream, such as in upcoming commands, which resources are used for input and which resources are used for output, which shader code is being used for the various stages in the GPU pipeline, and what is the current state of the 3d device. The Inter-frame Dependency block tests for resource dependency, which is important to making sure that no artifacts appear due to situations where rendering depends on resources that were updated in preceding frames. Inter-frame dependency is illustrated in FIG. 4C. At the first frame task_i creates and changes a resource (render target) which is repeatedly used (as a texture) in later frames; by task_j in the successive frame, and task_k some frames later. If the resolution control changes, the resource written by task_i, results in reduced size of the texture, therefore a corresponding change must be applied in subsequent frames, to prevent artifacts.

Figure 4D:
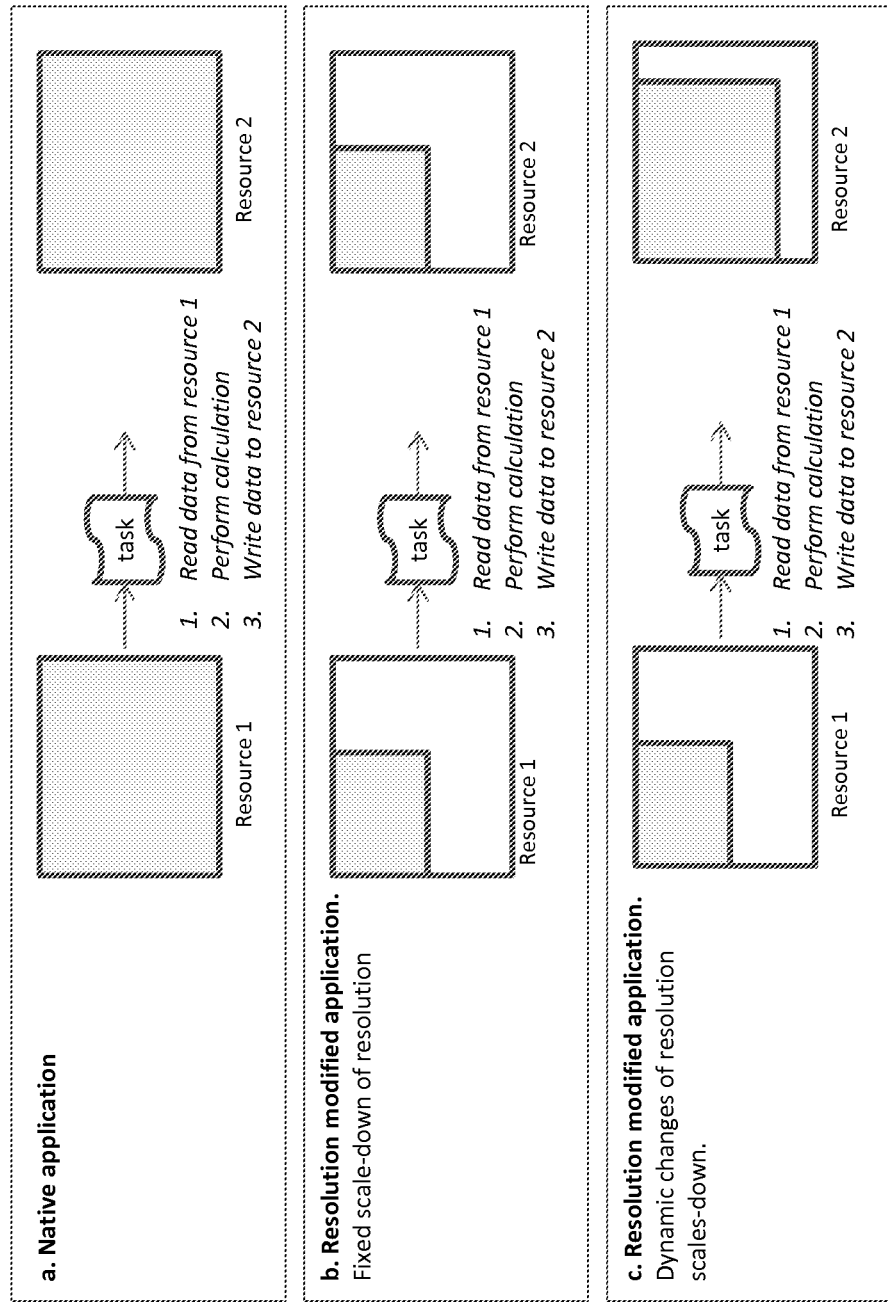
FIG. 4D. The capability to sample from one resolution and write to different resolution.

The capability to sample from one resolution and write to different resolution is exemplified in FIG. 4D. A non limiting example is shown of a task reading one texture resource, processing and writing into a second texture resource. (a) Native application, without resolution change. Both texture resources are of the same original resolution. (b) A resolution modified application. Both resources are of the same reduced resolution. (c) During the time collapsed between the creation of the first resource and processing and writing to second resource, changes of resolution may occur. The task must scale the resolution accordingly. It must be pointed that its not always reading from one resource and writing to one resource, as in the above example. It can also be read from few resources and write to one resource, or read from one and write to a few resources, or read from a few and write to a few.

Back to FIG. 4B, the inputs from blocks 421-424 assist the Resolution Control 426 forcing the desired resolution. The execution is given to the block of Command and Shader code Modifier. The resolution change is done by changing 3d API (aka graphics library) commands, especially (but not only) viewport functions and modification of Shader code, or changing the GPU device state.

During the frame, for each texture resource, a rendering resolution must be determined. This desirable resolution may be different from the original resolution as coded by the 'native' application. The resolution reduction in the texture resource is done by modifying the 3D API commands to render only part of that resource. For sampled resources that have been altered before, and therefore do not keep the original 'native' resolution any more, the sampling area must be recalculated properly. This occurs for all of the resources along the frame. However, toward the end of the frame the 2D HUD is usually the last element to be rendered. For the sake of visual quality, the HUD must be rendered in the original 'native' resolution. Therefore the HUD must be detected, and the entire pre-HUD image must be up-scaled to the entire resource size (the 3d scene before the HUD is drawn). The high quality up-scaling greatly improves the visual quality. From this point, the rendering goes on in full resolution.

Detection of HUD is done by accumulating 3D API commands to some degree (e.g. 30-40 commands) carrying out a back detection of the last command. The number of Back Buffer output tasks is coherent between successive frames (Back Buffer writes locality). So the HUD task can be in most cases spotted. Practically, the frequency of errors is extremely low, so in case of error, a frame can be dropped without being watched by the user. In exceptional games, where the mentioned frame coherency isn't strong enough, shader analysis methods are used, and the shader code is searched for known patterns to identify the HUD task beginning.

The resolution control block 426, as shown in FIG. 4B, gets complete information regarding the intercepted stream of commands and shader code from the Interceptor, the Stream Analyzer and the Inter-frame Dependency Analyzer. The resolution is decided upon for the next rendered frame. The main parameters are needed:
1. Target Frame Rate—This is the Frame Rate that the mechanism aims to achieve.
2. Maximum allowed quality hit—defining the reduction grade of the resolution. Lowering the resolution too drastically will hurt the user experience. For example, reasonable value is 0.5, which means that in our attempt to reach the target Frame Rate we allow to change the resolution to contain a quarter of the pixels of the Native game resolution.

Figure 5:
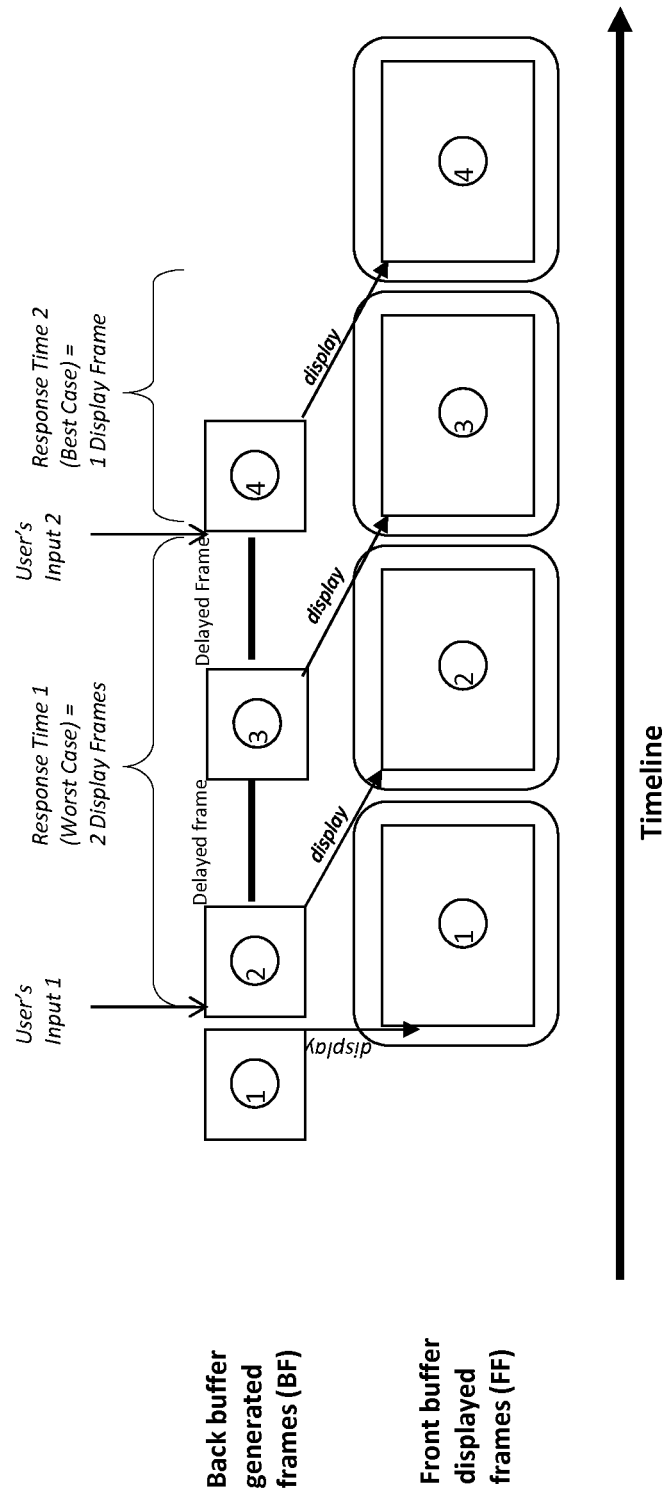
FIG. 5. A case of worsening responsiveness by delaying a frame.
Figure 6:
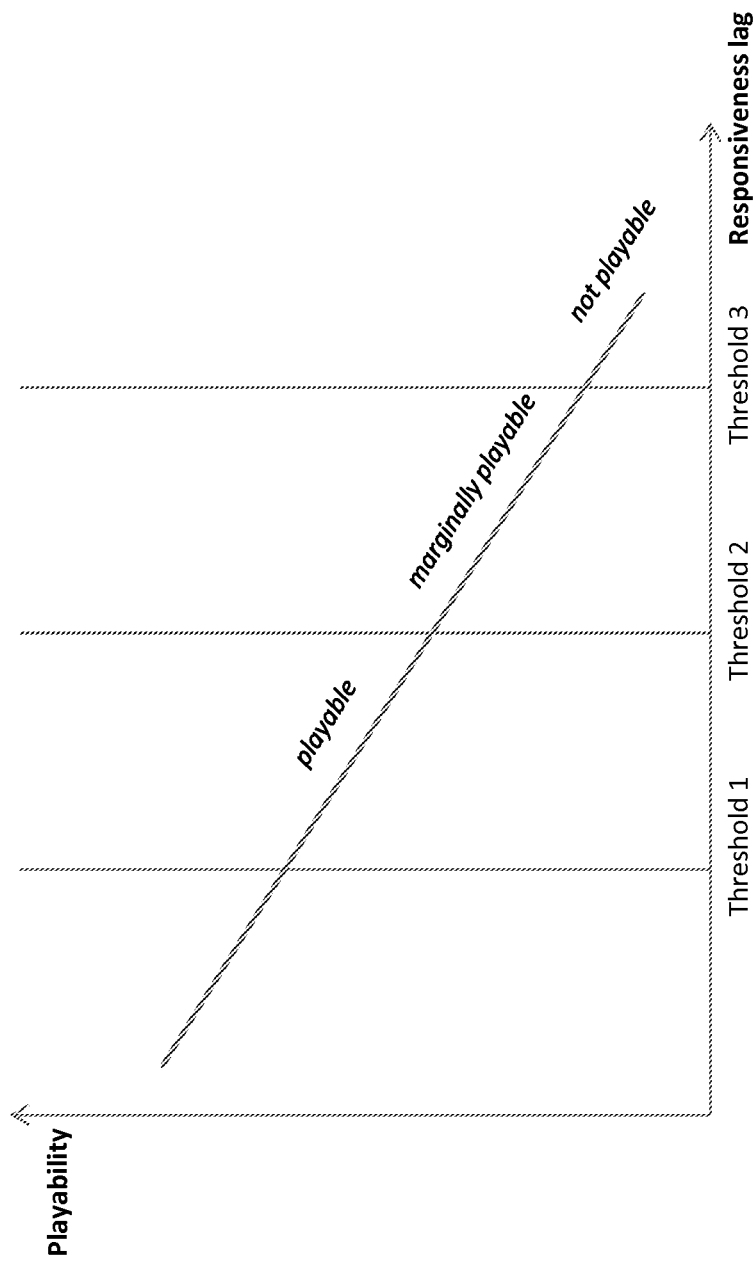
FIG. 6. Playability regions of video games as a function of responsiveness lag.

In real time, the mechanism receives the following information:
1. GPU Load—The current and past GPU load
2. CPU Load—The current and past CPU Load
3. Frame Rate—The current and past Frame Rate
By looking at both the GPU Load and the CPU Load we can understand if the Frame Rate is GPU bound.
    If it is not GPU bound, the dynamic resolution changing mechanism is not effective, and the visual quality shouldn't be reduced.
    If it is GPU bound, the dynamic resolution changing mechanism is effective, and the resolution would be modified to improve the user experience.
Combined with the GPU load, the current and preceding Frame Rate is considered, for the reduction/increase of currently used resolution.
Overshooting might lead to instability: too high Frame Rate than targeted, causing a decrease of resolution. Then, below the targeted Frame Rate causing an increase of resolution, etc. This undesired behavior hurts the user experience.
    It is prevented by the following logic:
    If current Frame Rate and target are close to each other by some delta, the resolution is not changed.
    The threshold for increase resolution is different from the threshold for decrease resolution A poor responsiveness to gamer's inputs is another outcome of a lowered frame rate in video games. A good interactive gaming requires precise timing or fast response times on gamer's inputs. The lower FPS, the higher input lags. Long input lags deteriorate the responsiveness of real-time graphics systems, interfering with games which require precise timing or fast reaction times. Good responsiveness is achieved by minimizing input lags. Low frame rate has a negative effect on game's responsiveness, due to application's lagged response on gamer's input. Poor responsiveness tends to deteriorate the playability. FIG. 5 exemplifies a case of worsening responsiveness by delaying a frame. Lowering FPS by frame delay is done in prior art, e.g. by Huang et al., in US 2011/0157191. The worse case is shown on user's input 1, which comes at the beginning of a display frame 1, and affects the display in display frame 3, causing lag of 2 frames. The best case is exemplified on user's input 2, initiated just before the start of displayed frame 3, and affects the image in display frame 4, causing a single frame lag. Single frame lag is normal. However, double or higher frame lag, without being aware to application playability may cause a deteriorated responsiveness to user's input. Poor input lags deteriorate the responsiveness of real-time games which require precise timing or fast reaction times. FIG. 6 shows how a responsiveness lag may affects the playability of a game.

Another source for poor responsiveness, other than input lags, is the game assets loading times. Graphics data, such as texture database, must be downloaded to GPU at the beginning of each game, and from time to time during the game. If an automatic decrease in the frame rate applies to the game with no application awareness, the user's experience is impaired by long loading times, because of the non-selective decrease of a frame rate, across the application. The approach to the loading period must be different than that of the rest of the game. While the rest of the game is slowed down by a decreased FPS and playability is still kept, the loading, which is a non playable intermission repeating as dead intervals along the game, must be speeded up in order to keep playability. When the FPS is artificially kept down, and a loading is detected, the frame rate must be returned to its non restricted value, or set to some high value, until the loading finalizes.

The backlight of the display may be dimmed to reduce the power consumption. In such a case the visual quality of the image might be harmed. In order to maintain the perceived visual quality of the displayed image, the contrast of the image may be adjusted at the time of converting the video image to RGB color space. However, this backlight/contrast ratio must be managed for a playable image quality.

Figure 7:
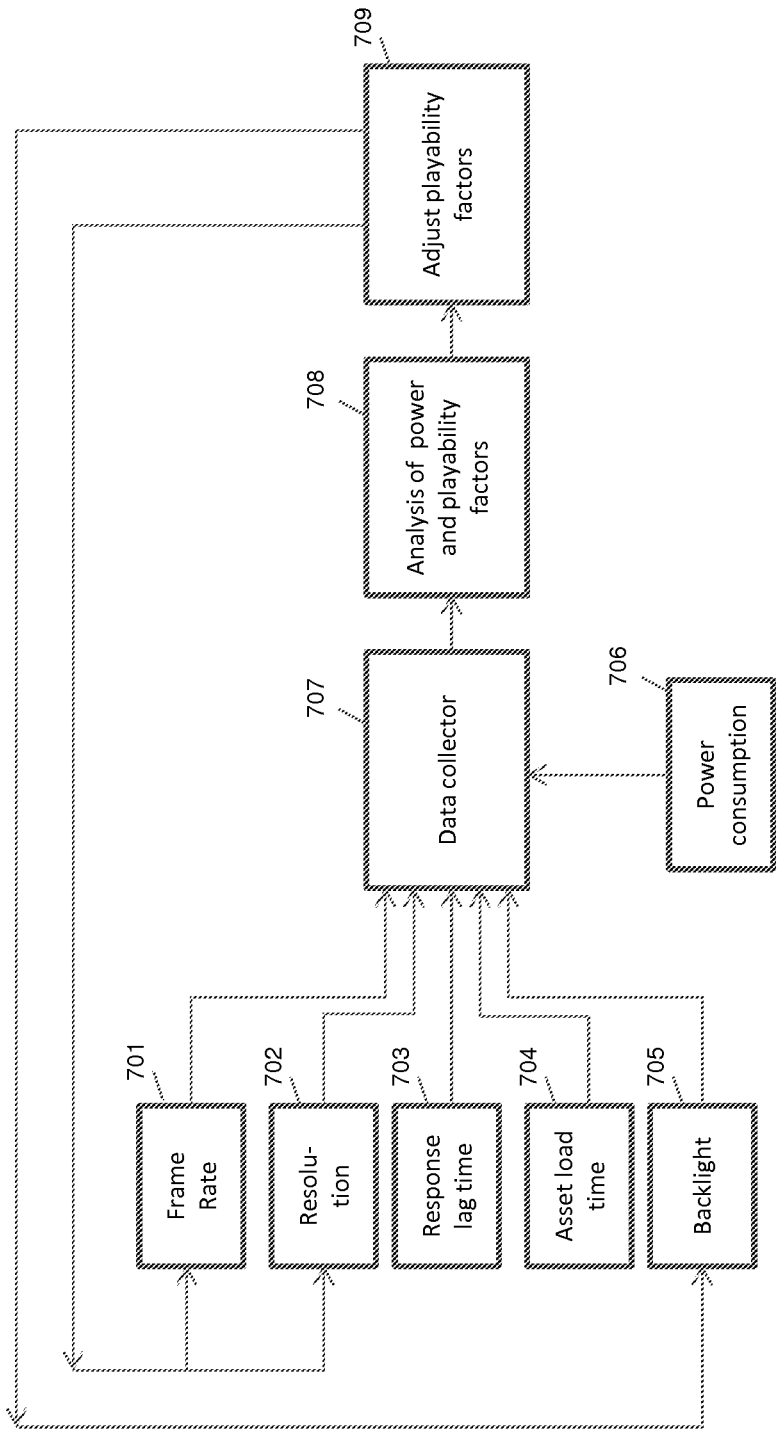
FIG. 7. A feedback based mechanism for managing the playability-based power conservation FIG. 8. Flowchart of playability driven power management.

FIG. 7 illustrates the mechanism for managing the playability-based power conservation. Basically it is a closed loop feedback mechanism in which the power consumption is sampled at the beginning of each frame, and if needed, it is adjusted by modifying the playability factors of frame rate, resolution and backlight. The other playability factors of responsiveness and asset load time, affected directly by the change of frame rate, must be taken into account for playability, in setting the new level of FPS. The Data Collector 707 reads in the Power Consumption status 706, and gathers the status of all playability factors: frame rate 701, resolution 702, response lag time 703, asset load time 704 and backlight level 705. The Analysis function block 708 analyzes the current power consumption against the conservation needs, resulting in the desirable consumption delta. This desirable delta is generated by appropriate changes by the Adjust box 709, in one of the playability factors: frame rate, resolution or backlight, or by some combination of two or three of them, when the responsiveness and asset load time factors are kept at the proper level.

Figure 8:
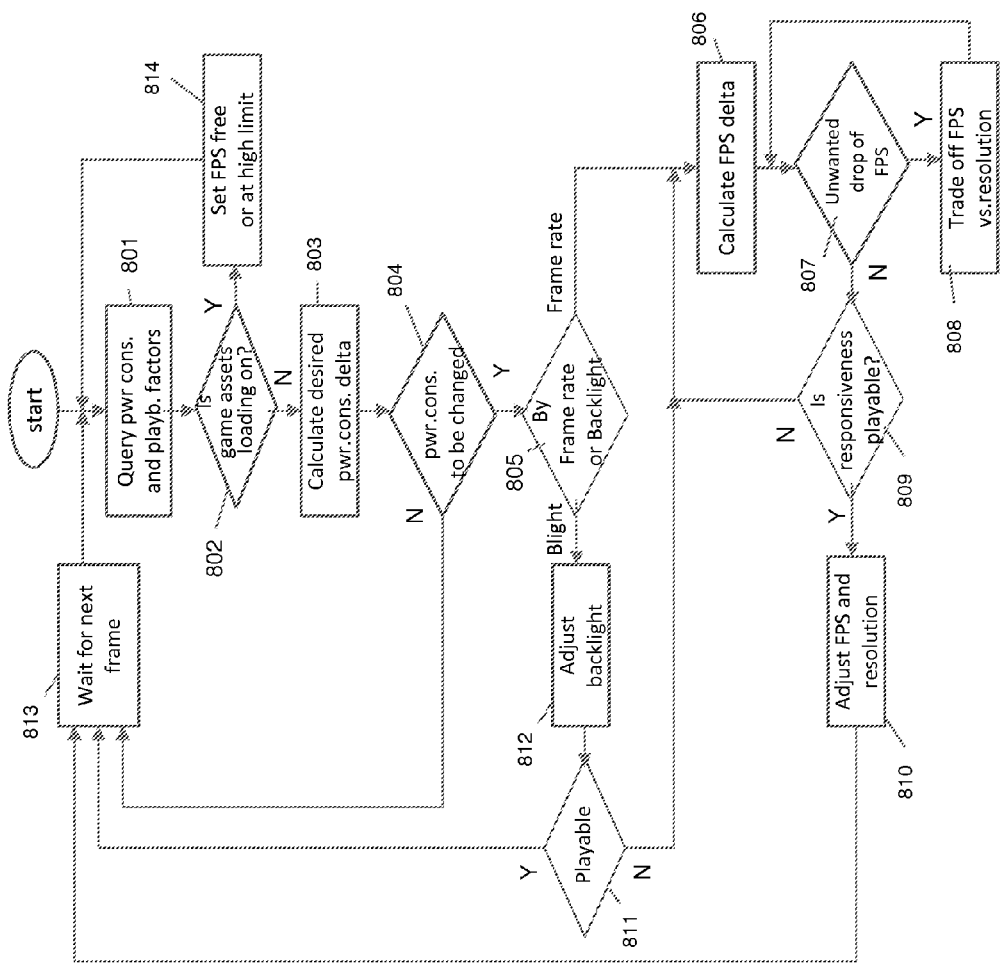

The playability driven power management of the present invention is flowcharted in FIG. 8, at the frame level. The current status of power consumption and playability factors are querried at 801. If the current frame occurs during game assets loading 802, then the frame rate should preferable be set free or set at some high limit, to speed up the dull time of loading. Otherwise, the power consumption status is used to calculate the desired delta 803, according to power management policy. If no change is needed 804, the flow stops for the frame, waiting for the next frame 813. Otherwise, we must decide what factor should be modified, back lighting or frame rate. If the adjust by back light is taken, the right adjust of backlight is calculated 812, and checked for playability. If the resulting image quality is going below playability level, we switch back to change of frame rate. The frame rate track starts from calculating the required FPS delta 806. This change of FPS can be traded off with change of resolution 808. This happens if the required FPS change drops below playability threshold 807. The final change of FPS is farther tested for its effect on responsiveness lag 809. If responsiveness is found not playable, another cycle of FPS/resolution trade off takes place. Finally the FPS and resolution are properly adjusted, and the playability-based power conservation system awaits the next frame 813.

What is claimed is:

1. A method for controlling image resolution in graphics systems at runtime comprising:
   providing a computer system having a CPU, one or more of an integrated or a discrete GPU, a display to display images, a non-transitory computer readable system memory and at least one application running on the computer system that generates at least one of a stream of graphic library commands and/or shader codes at run time;
   intercepting, analyzing and modifying the stream of graphics library commands and/or shaders codes generated by the running application at run time;
   (i) in the event that an on-the-fly change of resolution is desired for keeping a user's experience above a pre-defined minimal level, changing the resolution by modification of one or more of the:
   a. shader code, or
   b. graphics library commands;
   (ii) in the event that no change of resolution is desired, not changing the resolution.

2. The method of claim 1, wherein modified and unmodified shaders are cached in the memory for optimization.

3. The method of claim 1, wherein modifying the resolution is limited by at least one threshold, the at least one threshold selected from: bearable levels of at least one of frame rate, image resolution, image brightness, responsiveness and power consumption.

4. The method of claim 3, wherein any of the thresholds can be modified in the course of the run time of application.

5. method of claim 1, wherein a low threshold is used for preserving the application's playability.

6. The method of claim 1, wherein the shader code is modified on-the-fly for the desired resolution.

7. The method of claim 1, wherein the change of resolution is applied to 3D scenes only.

8. The method of claim 7, wherein 3D heads-up displays may be modified but 2-dimensional heads-up display may not be modified.

9. The method of claim 8, comprising the further step of detecting a heads-up display and wherein detection of heads-up display is accomplished by accumulating commands and carrying out an analysis prior to releasing the commands to a pipeline for rendering.

10. The method of claim 8, wherein detection of a heads-up display is accomplished by detecting the last rendering task in a frame that writes to a back buffer.

11. The method of claim 1, wherein an inter-frame dependency analyzer is provided to test resource dependency so as to prevent artifacts.

12. The method of claim 1, wherein the parameters for changing the resolution includes one or more of: the target frame rate, power consumption and the maximum allowed quality hit.

* * * * *